(12) United States Patent
Costantini et al.

(10) Patent No.: US 8,594,504 B2
(45) Date of Patent: Nov. 26, 2013

(54) OPTIMISED MULTIPLEXER/DEMULTIPLEXER OPTICAL STRUCTURE

(75) Inventors: Matteo Costantini, Genoa (IT); Alberto Deho, Genoa (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1144 days.

(21) Appl. No.: 11/915,565

(22) PCT Filed: May 26, 2006

(86) PCT No.: PCT/EP2006/005021
§ 371 (c)(1),
(2), (4) Date: Dec. 26, 2007

(87) PCT Pub. No.: WO2006/125659
PCT Pub. Date: Nov. 30, 2006

(65) Prior Publication Data
US 2008/0212966 A1    Sep. 4, 2008

(30) Foreign Application Priority Data

May 26, 2005 (IT) .............................. MI2005A0981

(51) Int. Cl.
*H04J 14/02* (2006.01)
(52) U.S. Cl.
USPC ............................................ 398/83; 398/79
(58) Field of Classification Search
USPC ..................................................... 398/79, 83
See application file for complete search history.

(56) References Cited

U.S. PATENT DOCUMENTS

| 5,748,350 | A | 5/1998 | Pan et al. | |
|---|---|---|---|---|
| 5,943,149 | A * | 8/1999 | Cearns et al. | 398/79 |
| 6,388,783 | B1 | 5/2002 | Weller-Brophy | |
| 2002/0154857 | A1 | 10/2002 | Goodman et al. | |
| 2004/0013355 | A1* | 1/2004 | Margalit | 385/27 |
| 2005/0013615 | A1 | 1/2005 | Matsuda et al. | |

FOREIGN PATENT DOCUMENTS

| EP | 0 938 205 | 8/1999 |
|---|---|---|
| WO | 2004/066534 | 8/2004 |

* cited by examiner

*Primary Examiner* — Nathan Curs
(74) *Attorney, Agent, or Firm* — Coats & Bennett, P.L.L.C.

(57) ABSTRACT

An optical demultiplexing structure and method for demultiplexing channels from a wavelength multiplexed optical signal comprising a first optical filter (115), a second optical filter (117), and at least one third optical filter (120), wherein the first filter has a band-pass characteristic for extracting a first set of channels from the optical signal, and the second filter has a cut-off wavelength corresponding to a wavelength within the pass-band of the first filter, and wherein the first filter is connected to the second filter, the second filter extracting a second set of channels from the channels that remain after extraction of first the set of channels by the first filter, and wherein the at least one third filter has a passband to extract a subset of channels from the second set of channels spaced apart from the first set of channels. The corresponding multiplexing structure and method are also described.

32 Claims, 10 Drawing Sheets

OPTIMISED MULTIPLEXER/DEMULTIPLEXER OPTICAL STRUCTURE

Figure 1:
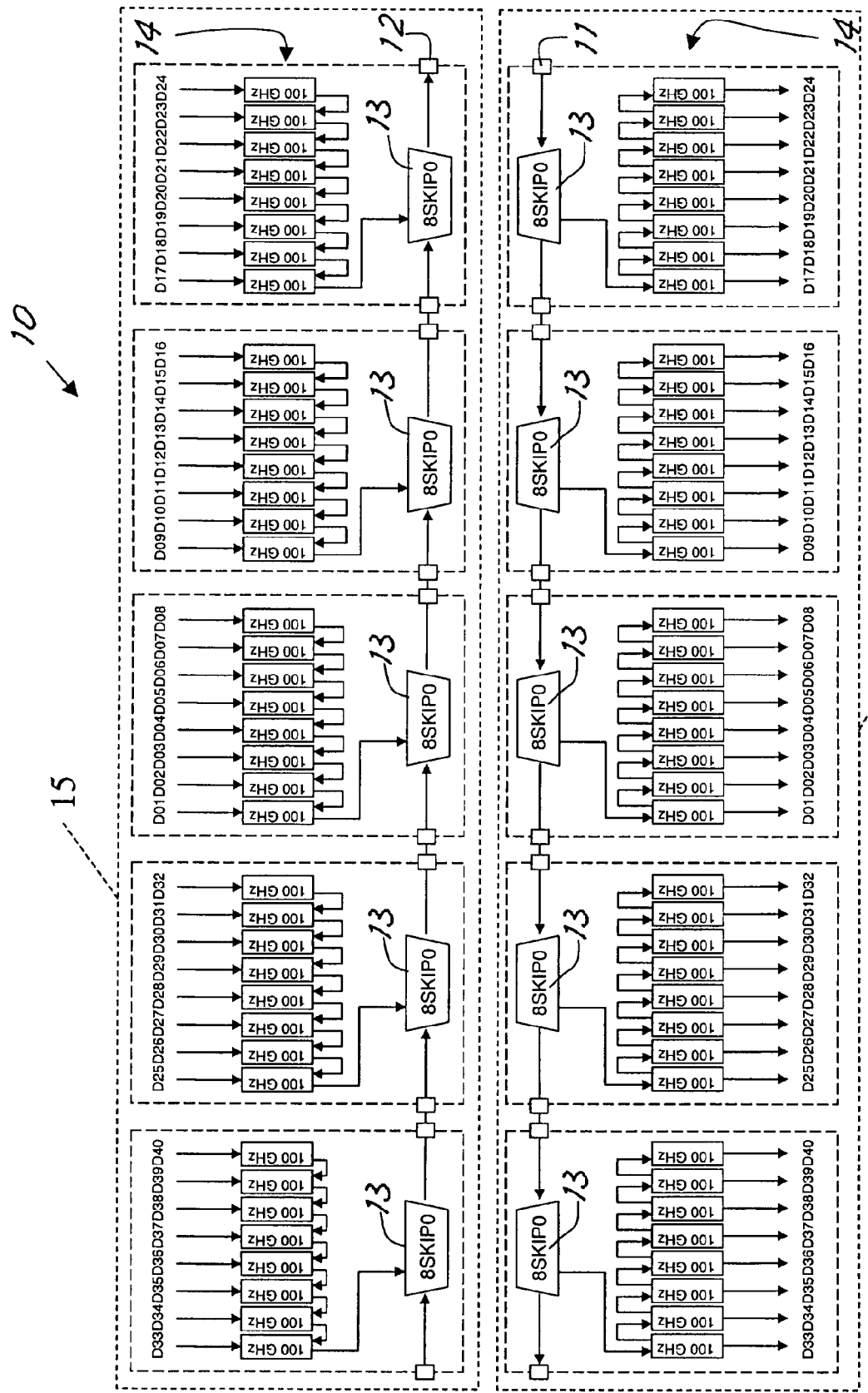

This invention relates to a Multiplexer/Demultiplexer (MUX/DEMUX) passive modular optical structure.

Passive optical systems are used for performing multiplexing and/or demultiplexing of channels separated in frequency (for example Wave Division Multiplexed (WDM) signals). This enables a plurality of channels to be allocated different wavelengths (and hence frequencies) such that they can be transmitted down a single transmission path without interfering with each other. Cascaded interconnected passive optical filters are used to filter individual channels.

In the realization of such cascaded optical filters it is important to limit the deterioration of channels due to passive filtering, that is losses that are experienced by a channel due to a filter as the channel passes through, or is reflected by, the filter. Deterioration can be due to insertion losses, reflection losses and/or chromatic dispersion losses introduced by the filters that each channel traverses.

A first known solution for realizing a passive MUX/DEMUX is to use cascaded passive filters, each with a bandwidth corresponding to one channel wherein each passive filter is centred on a different one of the channels. There are as many filters as there are channels. However, this causes very high deterioration of some channels compared to other channels. Indeed, in cascaded optical filters, all of the remaining wavelengths except the one on which the filter is centred are reflected to the next filter and each channel experiences deterioration as it is either reflected/rejected or passed. The channel that is intended for the last filter of the cascade has therefore been reflected as many times as there are filters preceding it.

For example, in a cascaded filter system for multiplexing and/or demultiplexing a WDM signal with 40 channels, the deterioration of the last channel, due only to the reflection losses (without considering other deterioration losses), would be of the order of forty times the deterioration of the first channel of the chain. In many situations this is unacceptable. A channel with such deterioration may require further amplification such that the quality of the channel is retained.

One prior art system that attempts to reduce the deterioration of channels comprises a MUX/DEMUX passive modular structure (for example, with 40 channels spaced by 100 GHz) based on the use of cascaded type 8skip0 filters. 8skip0 filters extract adjacent bands of 8-channels, and then cascaded channel filters are used to extract individual channels from each 8-channel band. In general, the term 'Xskip0 filter' is a filter with a pass-band bandwidth of X channels.

This modular solution reduces the number of filters that each channel traverses when compared to the previous solution. There are standard proposals for use with a WDM signal with 40 channels that use five cascaded 8skip0 filters, wherein each 8skip0 filter has eight cascaded channel filters associated with it to separate the groups of eight channels into individual channels.

One problem with this solution is that the channels at the edges of the 8skip0 filters are subjected to maximum chromatic dispersion from that filter plus the chromatic dispersion of the adjacent 8skip0 filter. In other words, channels at the edges of the band-pass characteristic curve (transmission profile) of each 8skip0 filter experience chromatic dispersion from both the 8skip0 filter that has passed that channel and the neighbouring 8skip0 filter. This means that the channels that are nearest the cut-off wavelengths/frequencies of the filter, and therefore are at the edges of a group/band of channels that have been extracted by the band-pass filter, experience double the chromatic dispersion to that experienced by channels that are not at the edge of a group of eight channels with an adjacent 8skip0 filter.

It will be appreciated that equivalent multiplexers are known.

Another difficulty in realizing passive MUX/DEMUX systems is that in addition to meeting the criteria of low channel deterioration, it is also desired to have modular structures that allow the number of channels handled by the system to be easily increased. For example, to upgrade the systems as the need for channels increases. In addition, it is generally preferable that the additional channels are positioned towards the outside of the channels that are already present in a system, and preferably adjacent to an outer channel that is already present in a system.

It is an aim of embodiments of the present invention to ameliorate the above-mentioned shortcomings by making available a MUX/DEMUX structure with passive filters that limits the deterioration of the channels compared to known solutions. Another aim of embodiments of the invention is to provide a modular structure that enables the number of channels to be increased easily.

According to a first aspect of the invention there is provided an optical demultiplexing structure for demultiplexing channels from a wavelength multiplexed optical signal comprising a first optical filter, a second optical filter, and at least one third optical filter, wherein the first optical filter has a band-pass characteristic for extracting a first set of channels from the optical signal, and the second optical filter has a cut-off wavelength that corresponds to a wavelength that is within the pass-band of the first optical filter, and wherein the first optical filter is connected to the second optical filter such that the channels that remain after extraction of the set of channels by the first optical filter are filtered by the second optical filter such that a second set of channels remains, and wherein the at least one third optical filter has a pass-band arranged to extract a subset of channels from the second set of channels that is spaced apart from the first set of channels.

Preferably, the subset of channels is not adjacent in wavelength to the first set of channels. There may be at least one channel between the subset of channels and the first set of channels. Preferably at least one channel, and more preferably at least two channels, will be located between the pass-bands of any two band-pass filters such that any deterioration that is suffered by channels that are near to a cut-off wavelength of a filter is not added to by any deterioration caused by further filters. For a band-pass filter, the characteristic curve has two cut-off wavelengths at an upper and lower region of the band-pass wavelengths.

Having a structure in which the band-pass filters are arranged so as not to extract adjacent bands/groups of channels enables the effects of chromatic dispersion to be reduced when compare with prior art systems. Also, the total number of filters that a channel must traverse in the structure/system is reduced when compared with the prior art.

Preferably, the channels that are nearest a cut-off wavelength of the third optical filter are spaced apart in wavelength from the channels that are nearest a cut-off wavelength of the first optical filter. Providing the channels that are nearest a cut-off wavelength of the third optical filter such that they are spaced apart from the channels that are nearest a cut-off wavelength of the first optical filter may result in the pass-band of the first optical filter being spaced apart in wavelength from the pass-band of the third optical filter, and preferably the two pass-bands do not overlap.

The second optical filter is arranged such that the cut-off wavelength is located within the pass-band of the first optical filter such that any imperfections in the transmission profile of the second optical filter are also located in the gap that has been created by the extraction of the first optical filter. This means that the imperfections may not negatively affect the remaining channels, or at least may reduce the effects of the imperfections on the remaining channels. In some embodiments this can mean that a less expensive, and more economical, second optical filter with a lower technical specification can be used without detracting substantially from the performance of the demultiplexer. With prior art systems a choice may have to be made between using an expensive optical filter with a good transmission profile and allowing some of the neighbouring channels to be deteriorated. In other prior art systems, one or more channels may simply be not used, and this obviously reduces the overall bandwidth capacity of the system.

Preferably the structure further comprises a first optical channel extraction unit and a second optical channel extraction unit arranged to extract individual channels from the sets and subsets of channels. The optical extraction units may be arranged to extract individual channels from a group/set/band of channels, and preferably isolate the individual channels onto separate transmission paths so that they can be provided on output ports/pins. The first and/or second optical channel extraction units may comprise at least one cascade of channel filters.

The first optical filter may be an Xskip0 type optical filter with X equal to a preset number of channels, and/or the at least one third optical filter may be an Xskip0 type optical filter with X equal to a preset number of channels. Xskip0 filter provide convenient band-pass filters for extracting a set or subset of channels, which may be the same or different to the preset number of channels of the first optical filter.

Preferably, the first set of channels comprises intermediate channels that are intermediate the full set of channels in the WDM signal, and the second optical filter is a high/low wavelength optical splitter having an intersection wavelength that corresponds to a wavelength that is within the pass-band of the first optical filter, and is arranged to divide the channels that remain after the extraction of the first intermediate set of channels such that the second and third sets of channels comprise channels that are above and below the first set of extracted channels respectively.

The intermediate first set of channels are not at an end of the WDM signal, that is, there is at least one channel that is at a higher wavelength than the wavelengths of the first set of channels, and at least one channel that is at a lower wavelength than the wavelengths of the first set of channels.

Using a system where the first set of channels is an intermediate set of channels enables a second and third set of channels to be obtained that are above and below the first set of channels in terms of wavelength/frequency. This provides the advantage that the second and third sets of channels can be demultiplexed in parallel, and further serves to reduce the number of filters that a channel must be traversed before being completely demultiplexed when compared with the prior art.

The structure may further comprise a third optical extraction unit arranged to extract individual channels from the third set of channels.

The structure may further comprise a fourth optical filter associated with the third optical filter, wherein the fourth optical filter has a transmission wavelength that is within the pass-band of the third optical filter, and is arranged such that the channels that remain after extraction of the first subset of channels by the third optical filter are divided into a second subset of channels by the fourth optical filter.

Subsequent filters may be provided that drill down into the sets of channels such that a set, or a subset, may be divided into further subsets any number of times until a certain number of channels remain in the subset/set. The certain number of channels may be a threshold value at which it is more beneficial to extract the individual channels rather than subdivide the set into further subsets. One or more channel extraction units may be used once the number of channels within a set drops below, or equals, the threshold value. The threshold value may be 16, 8, 6, or 4 channels, as an example. In other embodiments, the number of channels extracted by an upstream optical filter with a band-pass characteristic may be selected such that a predefined number, or less than a predefined number, of channels will be left in a downstream subset. Preferably, using an upstream optical filter to extract a predefined number of channels controls the number of channels left in a final subset for individual channel extraction. The predefined number of channels may correspond to a convenient number of channels that a channel extraction unit can extract.

Preferably, the fourth optical filter is a high/low wavelength optical splitter having an intersection wavelength that corresponds to a wavelength that is within the pass-band of the third optical filter, and is arranged to divide the remaining channels into a second and third subset of channels comprising sets of channels that are above and below the first intermediate subset of channels that are within the pass-band of the third optical filter.

The intersection wavelength of the wavelength optical splitter is a cut-off wavelength/frequency whereby any channels having a wavelength that is greater than the cut-off wavelength are grouped into one signal, and any channels having a wavelength that is less than the cut-off wavelength are grouped into another different signal.

Each of the optical channel extraction units may be assembled on a respective extraction module in order to provide a modular composition of the structure. This can allow for the total number of channels that the multiplexer/demultiplexer to be easily increased or decreased by adding or subtracting further modules to the structure.

According to a second aspect of the invention there is provided an optical multiplexing structure for multiplexing channels to obtain a wavelength division multiplexed optical signal comprising a first optical filter, a second optical filter, and at least one third optical filter, wherein the first optical filter has a band-pass characteristic for combining/grouping a first set of channels having wavelengths within the pass-band with a second set of channels having wavelengths that are outside of the pass-band to form a wavelength division multiplexed optical signal, the second optical filter has a cut-off wavelength that is within the pass-band of the first optical filter and is arranged to combine/group the second set of channels, and wherein the at least one third optical filter has a pass-band and is arranged to combine/group a first subset of channels having wavelengths within its pass-band, wherein the first subset of channels forms a subset of the second set of channels, and wherein the first subset of channels is spaced apart from the first set of channels.

Preferably, the channels that are nearest a cut-off wavelength of the third optical filter are spaced apart in wavelength from the channels that are nearest a cut-off wavelength of the first optical filter The structure may further comprise a first optical grouping/concatenation unit and a second optical grouping/concatenation unit arranged to concatenate/group individual channels into the sets and subsets of channels. The first and/or second optical channel concatenation units may comprise at least one cascade of individual channel filters.

The first optical filter may be an Xskip0 type filter with X equal to a preset number of channels, and/or the at least one third optical filter may be an Xskip0 type filter with X equal to a preset number of channels.

Preferably, the first set of channels is an intermediate set of channels and the second optical filter is an optical splitter used in a reverse configuration with an intersection zone at a wavelength that corresponds to a wavelength that is within the pass-band of the first optical filter. The optical splitter may be arranged to combine the second set of channels with a third set of channels wherein the channels present in the second and third sets of channels correspond to wavelengths that are above and below the first set of channels and wherein the first optical filter is further arranged to combine the first, second and third sets of channels.

The multiplexing structure may further comprise a third optical concatenation unit.

Preferably, the structure further comprises a fourth optical filter associated with the third optical filter, wherein the fourth optical filter has a cut-off wavelength that corresponds to a wavelength that is within the pass-band of the third optical filter, and is arranged to combine a second subset of channels and supply the second subset of channels to the third optical filter where the second subset of channels is combined with the first subset of channels.

The fourth optical filter may be an optical splitter associated with the third optical filter, and may be arranged such that the intersection wavelength of the optical splitter corresponds to a wavelength that is within the pass-band of the associated third optical filter, and is arranged to combine the second subset of channels with a third subset of channels that comprise sets of channels that are above and below the first subset of channels that is within the pass-band of the third optical filter.

The structure may comprise "n" further downstream optical filters, which comprise band-pass filters with associated optical splitters, arranged to extract a band of channels from a subset, and subdivide the remaining channels into further subsets of channels.

The concatenation units may be each mounted on a respective multiplexing module for a modular composition of the structure. The band characteristics of the Xskip0 filter may be selected for combining at least four channels. The number of channels extracted by the Xskip0 filter may be eight.

According to a third aspect of the invention, there is provided a method for optically demultiplexing channels from a wavelength multiplexed optical signal comprising the steps of:

a) extracting a first set of channels from the wavelength multiplexed optical signal, b) dividing the remaining channels into a second set of channels at a cut-off wavelength that corresponds to a channel within the first set of channels; and c) extracting a subset of channels from the second set of channels that are spaced apart from the first set of channels.

Preferably, a channel at an end of the subset of channels is spaced apart in wavelength from a channel at an end of the first set of channels.

The method may further comprise:

d) separating the sets and subsets of channels into individual channels.

The demultiplexing method may further comprising repeating steps a) to c) with the remaining sets of channels after extracting a first set of channels until the number of channels in the remaining sets is less than or equal to a preset number of channels.

Preferably, the first set of channels is an intermediate set of channels and step b) further comprises dividing the remaining channels into a second and third set of channels that are above and below the first set of channels respectively.

According to a fourth aspect of the invention, there is provided a method of generating a wavelength division multiplexed optical signal comprising the steps of:

a) combining/grouping at least one channel to form a first set of channels;

b) combining/grouping at least one different channel to form a subset of channels, wherein the first subset of channels is spaced apart from the first set of channels;

c) combining/grouping the subset of channels with at least one different channel at a cut-off wavelength that corresponds to a channel within the first set of channels to form a second set of channels; and d) combining/grouping the first and second sets of channels to generate the wavelength division multiplexed optical signal.

Preferably, a channel at an end of the subset of channels is spaced apart in wavelength from a channel at an end of the first set of channels Any of the at least one channels may comprise a plurality of channels.

Grouping channels and subsets of channels may comprise combining the channels onto a single transmission path and/or allocating as belonging to the same group of channels.

The method may further comprise repeating steps a) to d) by combining a plurality of channels or subsets of channels to further multiplex a number of wavelength division multiplexed optical signals.

Preferably, the first set of channels is an intermediate set of channels and the method further comprises combining a different set of channels to form a third set of channels wherein the second and third sets of channels are above and below the first intermediate set of channels, and wherein step c) further comprises combining the second set of channels with the third set of channels at the cut-off wavelength that corresponds to a channel within the first set of channels, and step d) further comprises combining the first, second and third set of channels to generate the wavelength division multiplexed signal.

Preferably, the method further comprises concatenating individual channels into the sets and subsets of channels. In other embodiments there may be no predefined sequential order in the channels, and the channels may be allocated into sets and subsets with their sequential order being determined as the channels are multiplexed/demultiplexed.

According to a further aspect of the invention there is provided a method of demultiplexing a wavelength division multiplexed signal, comprising:

a) using a first Xskip0 filter to extract a first set of channels having a wavelength that is not adjacent to the wavelength of any previously extracted set of channels;

b) dividing the remaining signals into two further sets of signals;

c) repeating steps a) and b) for each subsequent divided set of signals until the wavelength of each set of signals is smaller than a threshold size; and d) extracting the individual channels from each of the sets of channels.

According to a further aspect of the invention there is provided a method of multiplexing comprising combining/allocating a plurality of input signals to a corresponding plurality of frequency signals, and producing a multiplexed signal comprised of the frequency signals by:— transducing a first plurality of input signals to a corresponding first group of a plurality of frequency signals of contiguous adjacent frequencies;

transducing a second plurality of input signals to a corresponding second group of a plurality of frequency signals of contiguous adjacent frequencies;

transducing a third plurality of input signals to a corresponding third group of a plurality of frequency signals of contiguous adjacent frequencies, the first and second groups of contiguous frequency signals being disposed in frequency either side of the range of frequencies of the third group of frequencies; and adding the first and second groups of signals together to form an intermediate combined signal and then subsequently adding the third group of signals to the intermediate combined signal to form a multiplexed signal.

According to a further aspect of the invention there is provided a demultiplexer arranged to split a signal into two by using an extraction unit to extract a central span of channels and a splitter, splitting at a wavelength in the extracted band, arranged to split signal into a below-central span group and an above-central span group, and use extraction units to extract signals from the above-central span group and from the below-central span group at a wavelength range in each group that is disposed away from the central span so as to leave signals in the above-central span group and below-central span group that are closer to the central span.

The central span may not necessarily be the real centre of a wavelength range of the signal, but in some embodiments it can be.

The above-central and below-central groups may or may not be symmetrically disposed about the gap/central span. That is, the above-central and below-central groups may or may not have the same number of channels in them.

There may be provided an optical demultiplexing structure for demultiplexing channels from a wavelength multiplexed optical signal comprising an optical filter having a band characteristic for extracting a first intermediate set of channels from the optical signal characterized in that it comprises a second optical filter having a transition wavelength within the band of the first filter and connected to receive from the first filter the signal with the channels remaining after extraction of the intermediate set of channels and for dividing said remaining channels into a second and third sets of channels.

There may also be provided a wavelength optical multiplexing structure of channels to obtain a wavelength multiplexed optical signal comprising a first and a second optical unit for multiplexing respectively a first and a second set of channels separated by a band gap suited to receiving exactly a third set of multiplexed channels by means of a third optical unit with a first optical filter having band characteristics for containing said preset number of channels of the third set and to have a band contained in said band gap and with a second optical filter used as an adder having transition wavelength inside the band of the first optical filter and that receives the first and second sets of channels and sends the sum to the first optical filter connected for receiving said sum and insert therein the third set of channels in said band gap and thus obtain an optical signal formed from the multiplexing of the first, second and third set of channels.

Some embodiments of the invention may provide a method of optical demultiplexing of channels from a wavelength multiplexed optical signal in comprising the steps of, a) with an optical filter extract an intermediate set of channels, b) dividing the channels remaining after extraction into two other channel groups by means of an optical filter having transition wavelength within the band of the first filter and for each of the two other channel groups if the number of channels of the other group is greater than a preset number of channels, c) extract from the group with an optical filter another set of channels not adjacent to a set of channels already extracted, d) repeat steps b) to d) with the channels remaining after extraction.

Further embodiments of the invention may provide a method for wavelength optical multiplexing of channels in an optical signal comprising the steps of, a) form a first and second sets of multiplexed channels separated by a band gap suited to receiving exactly a third set of multiplexed channels, b) add the first and second sets of channels using an adding optical filter having transition wavelength falling within said band gap, c) use another optical filter having band characteristics to contain said preset number of channels of the third set and to have a band contained in said band gap to receive the sum outlet from the adding filter and insert therein the third set of channels in said band gap and thus obtain an optical signal formed from the multiplexing of the first, second and third sets.

The second optical filter may comprise a high/low wavelength optical splitter having splitter cut within the band of said intermediate set of channels and connected for receiving from the first optical filter the signal with the remaining channels after extraction of the intermediate set of channels and for dividing said remaining channels in said second and third set of channels formed respectively from channels above and below the first group of extracted channels.

The second and/or third optical units may comprise at least one other first optical filter having band positioned for extracting a different other set of channels with the bands of said other optical filters being selected so that the sets of channels extracted thereby are not adjacent to each other and to said first set of channels.

With at least some of the other first optical filters may be associated another second optical filter having transition wavelength within the band of the associated other first filter and that it is connected to receive therefrom the signal with the remaining channels after extraction of the respective channels and to divide such remaining channels in two other sets of channels.

The other second optical filter (417, 517, 617) may comprise a high/low wavelength optical splitter having splitter cut inside the band of the corresponding other first filter and connected for receiving therefrom the signal with the remaining channels after extraction of the respective channels and dividing said remaining channels of said two other sets of remaining channels formed respectively from the channels over and under the respective extracted channels.

The first, second and/or third optical extraction units may comprise, individually or in cascade, extraction units selected from among:

a cascade of individual channel filters separating the individual channels of the signal sent to it;

an Xskip0 type optical filter having band characteristics for extracting another set of channels from the signal sent to it and with an associated second filter having transition wavelength within the filter band and connected to receive from the first filter the signal with the remaining channels after extraction of the intermediate set of channels and to divide said remaining channels into a second and third set of channels, and an Xskip0 optical filter having band characteristics for extracting another set of channels from the signal sent to it and with at least one associated cascade of individual channel filters separating the individual channels of the other set of channels and/or of the set of channels remaining after extraction of the other set of channels.

There may be provided a structure for wavelength optical multiplexing of channels to obtain a wavelength multiplexed optical signal comprising:
- a first and a second optical unit for multiplexing respectively a first and a second set of channels separated by a band gap suitable to receiving exactly a third set of multiplexed channels by means of a third optical unit;
- a first optical filter having band characteristics for containing said preset number of channels of the third set and for having band contained in said band gap; and
- a second optical filter used as adder having transition wavelength within the band of the first optical filter and that receives the first and second channel sets and sends the sum to the first optical filter that is connected to receive said sum and insert therein the third set of channels in said band gap and thus obtain an optical signal formed by multiplexing the channels of the first, second and third sets.

The first optical filter may be an Xskip0 type filter with X equal to the preset number of channels of the third set.

The second optical filter may comprise an optical splitter used as adder with splitter cut inside the band of first optical filter.

The first, second and/or third optical units may comprise at least one cascade of channel optical filters with each filter of the cascade receiving a channel for composing the first, second and/or third set of channels respectively.

The first and/or second optical unit may comprise at least one other optical filter having band positioned for inserting a different other set of channels with the bands of said other filters being selected so that the channel sets inserted thereby are not adjacent to each other and to said third set of channels.

There may be provided one other optical filter having its transition wavelength within the band of the associated other first filter is associated with at least some of the other optical filters and that it is connected to receive two subsets of channels and send their sum as a set of channels to the associated optical filter.

The other second optical filter may comprise an optical splitter used as adder having splitter cut inside the band of the corresponding other filter and that it is connected to receive two subsets of channels and send the sum as set of channels to the associated optical filter.

The first, second and/or third optical groups may comprise individually or in cascade multiplexing groups selected from among:
- a cascade of individual channel filters which constitute together individual channels sent to it;
- an Xskip0 optical filter with X equal to a preset number of channels and band characteristics for inserting another set of X channels into the signal sent to it and with an associated optical splitter used as adder and with splitter cut inside the band of the associated Xskip0 filter and that is connected to receive two subsets of channels and send their sum as a set of channel to the associated Xskip0 optical filter;
- an Xskip0 optical filter with X equal to a preset number of channels and band characteristics for inserting another set of X channels into the signal sent to it and with at least one cascade of associated individual channel filters that constitute together the individual channels sent to it and send their sum as a set of channels to the associated Xskip0 filter.

There may be provided a method for optical demultiplexing of channels from a wavelength multiplexed optical signal with the method comprising the steps of:
a) extract with an optical filter an intermediate set of channels,
b) after extraction, divide the remaining channels into two other channel groups by means of an optical filter having a transition wavelength within the band of the first filter;
for each of said two other groups of channels, if the number of channels in the other group is higher than a preset number of channels:
c) extract from the group by means of a optical filter another set of channels not adjacent to a set of channels already extracted; and
d) repeat steps b) to d) with the channels remaining after extraction.

If the number of channels of another group is less than or equal to the preset number of channels, the channels of the group may be directly separated from each other by passage in a cascade of channel filters.

There may be provided a method for wavelength optical multiplexing of channels in an optical signal comprising the steps of:
a) form a first and second multiplexed channel optical sets separated by a band gap suitable to receive exactly a third set of multiplexed channels;
b) add the first and second channel sets by using an optical filter adder having transition wavelength falling within said band gap; and
c) use another optical filter for receiving the sum outlet from the adder filter and insert therein the third set of channels in said band gap and obtain thus an optical signal formed by multiplexing of the first, second and third channel sets with the other optical filter having band characteristics for containing said preset number of channels of the third set and for having a band contained in said band gap.

The optical filter adder may be an optical splitter with splitter cut within said band gap.

The channel sets may be obtained by adding to a set of multiplexed channel at last one subset of channels while using for the sum another Xskip0 optical filter with X equal o the number of channels of the subset and choosing the bands of said other filters so that the subsets of channels inserted by them are not adjacent to each other and to said third set of channels.

At least some of the other Xskip0 optical filters may be associated an optical splitter used as adder with said splitter having its splitter cut in the band of the corresponding other Xskip0 filter and being connected to receive two other subsets of channels that are separated by the band width of the corresponding Xskip0 filter and to send the sum thereof as a set of channels to the associated Xskip0 optical filter.

It will be appreciated that any of the features described above may be equally applicable to any of the other aspects of the invention, and/or any of the embodiments of the invention.

Figure 2A:
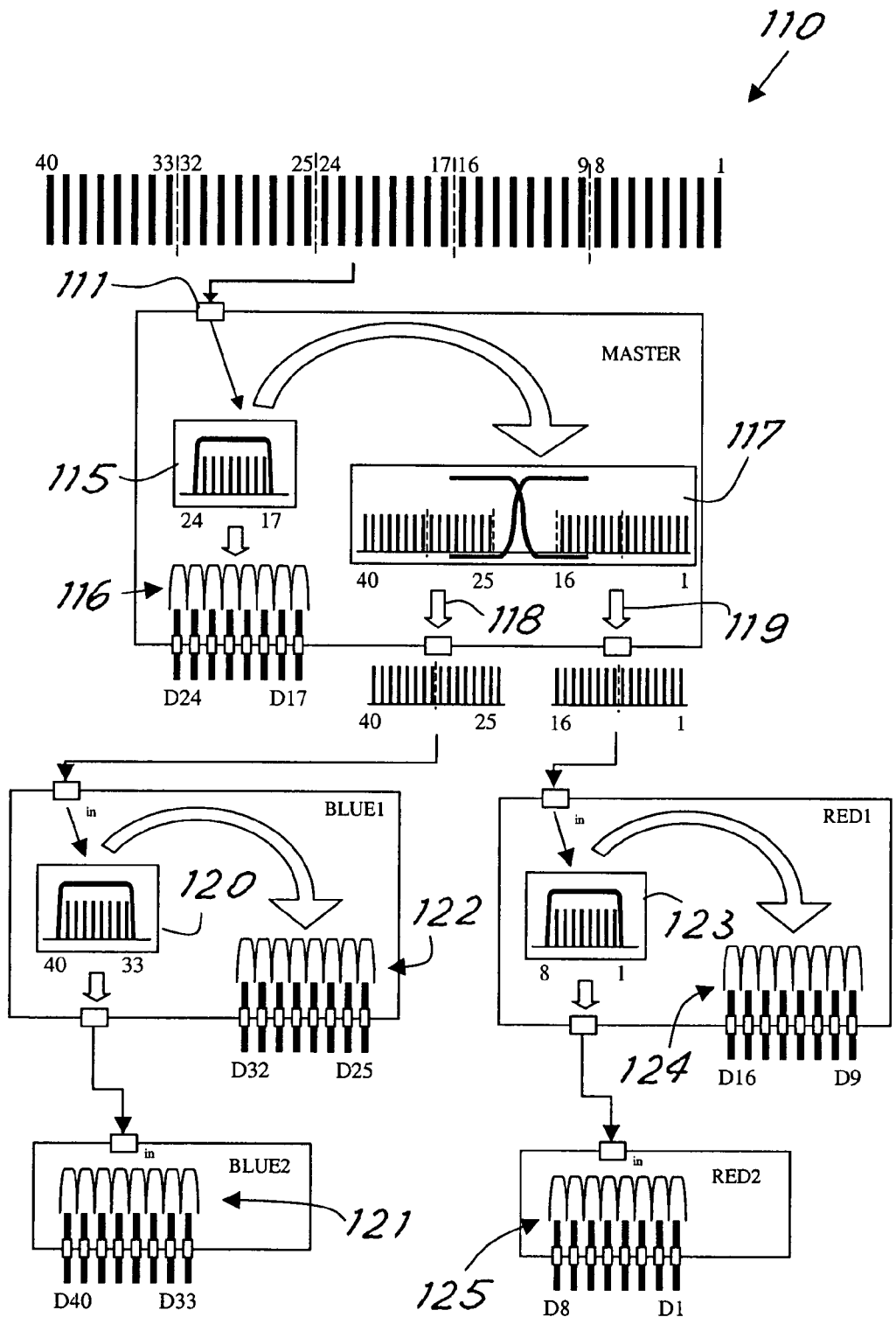
Figure 2B:
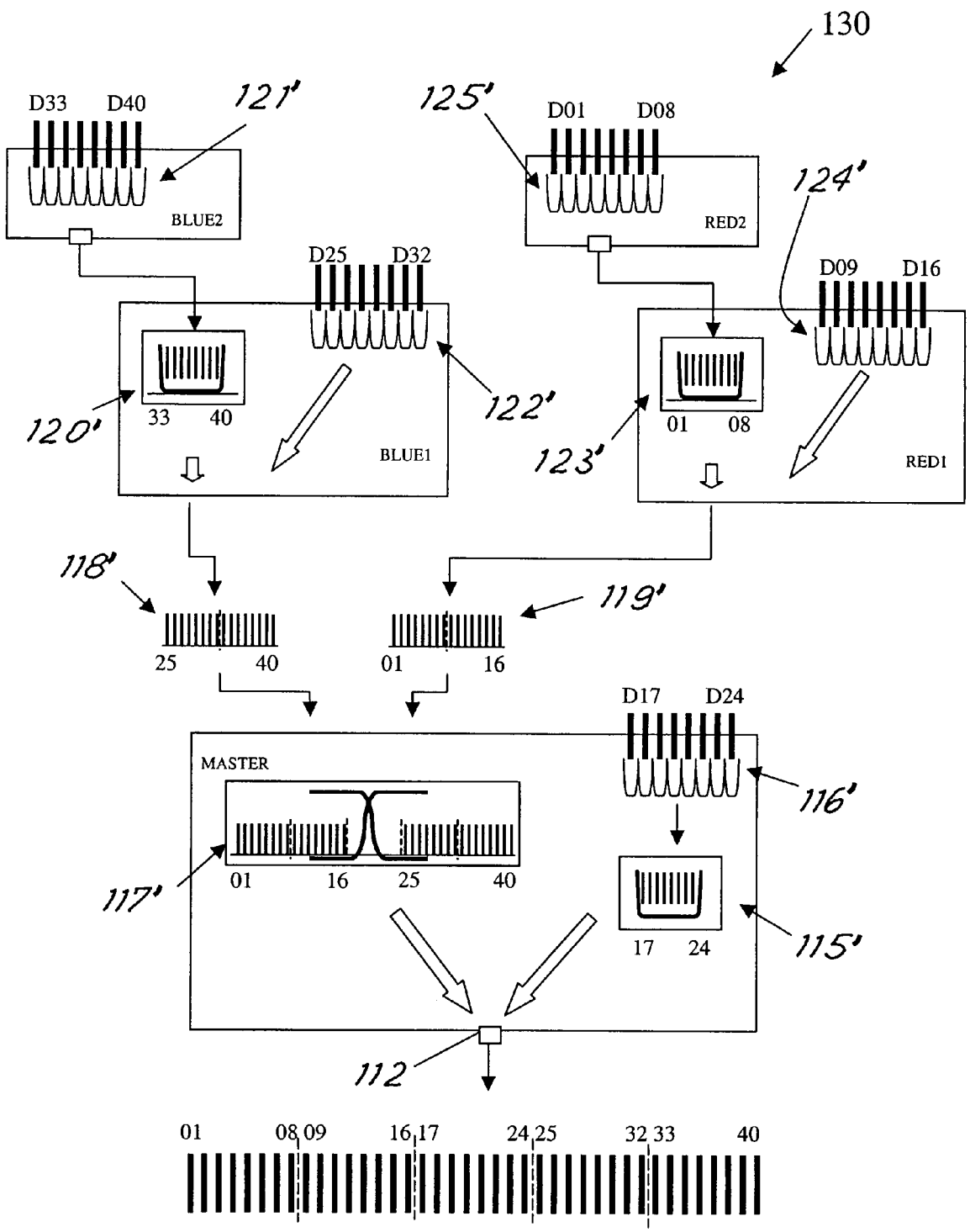
Figure 3:
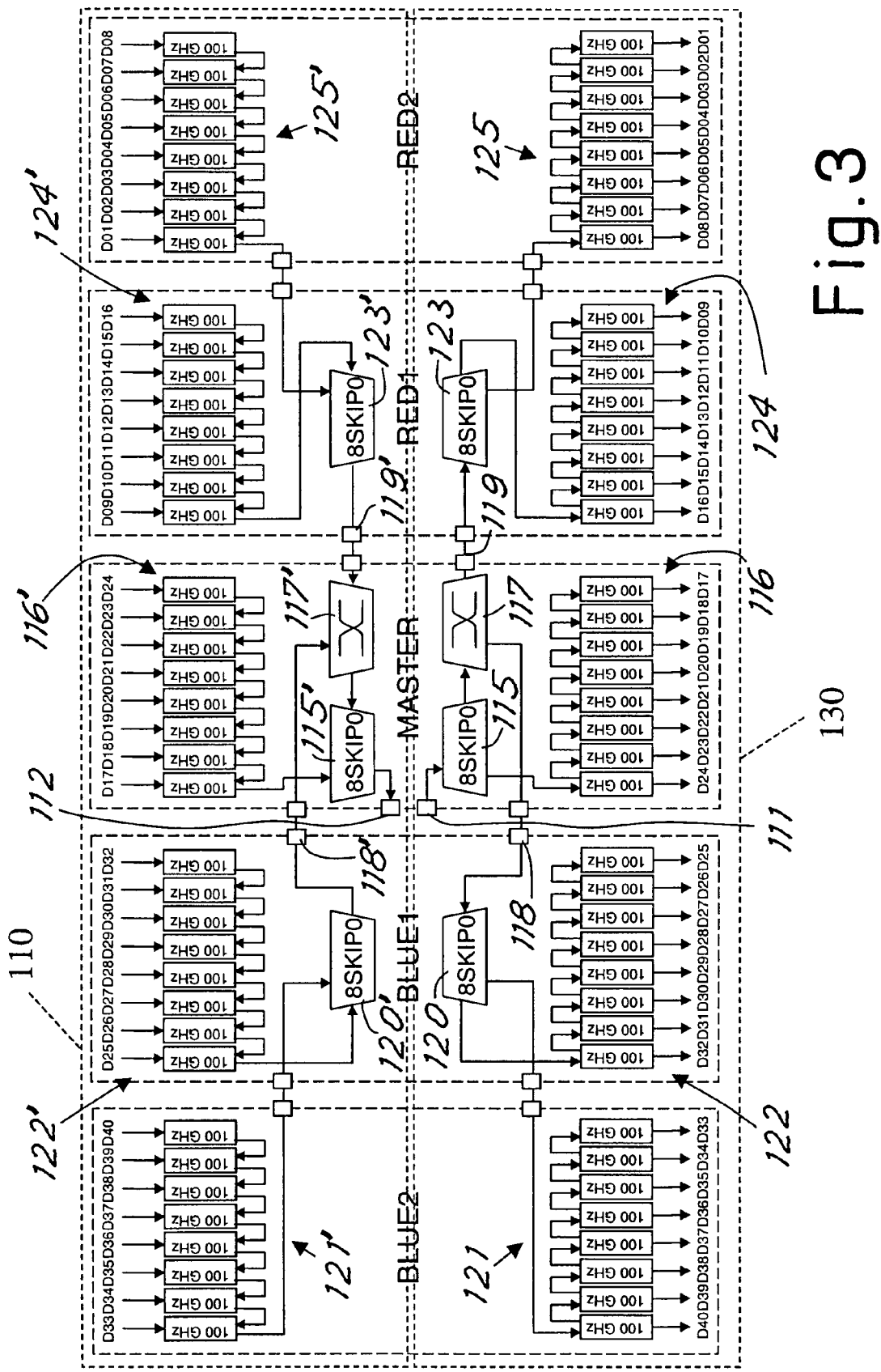
Figure 4:
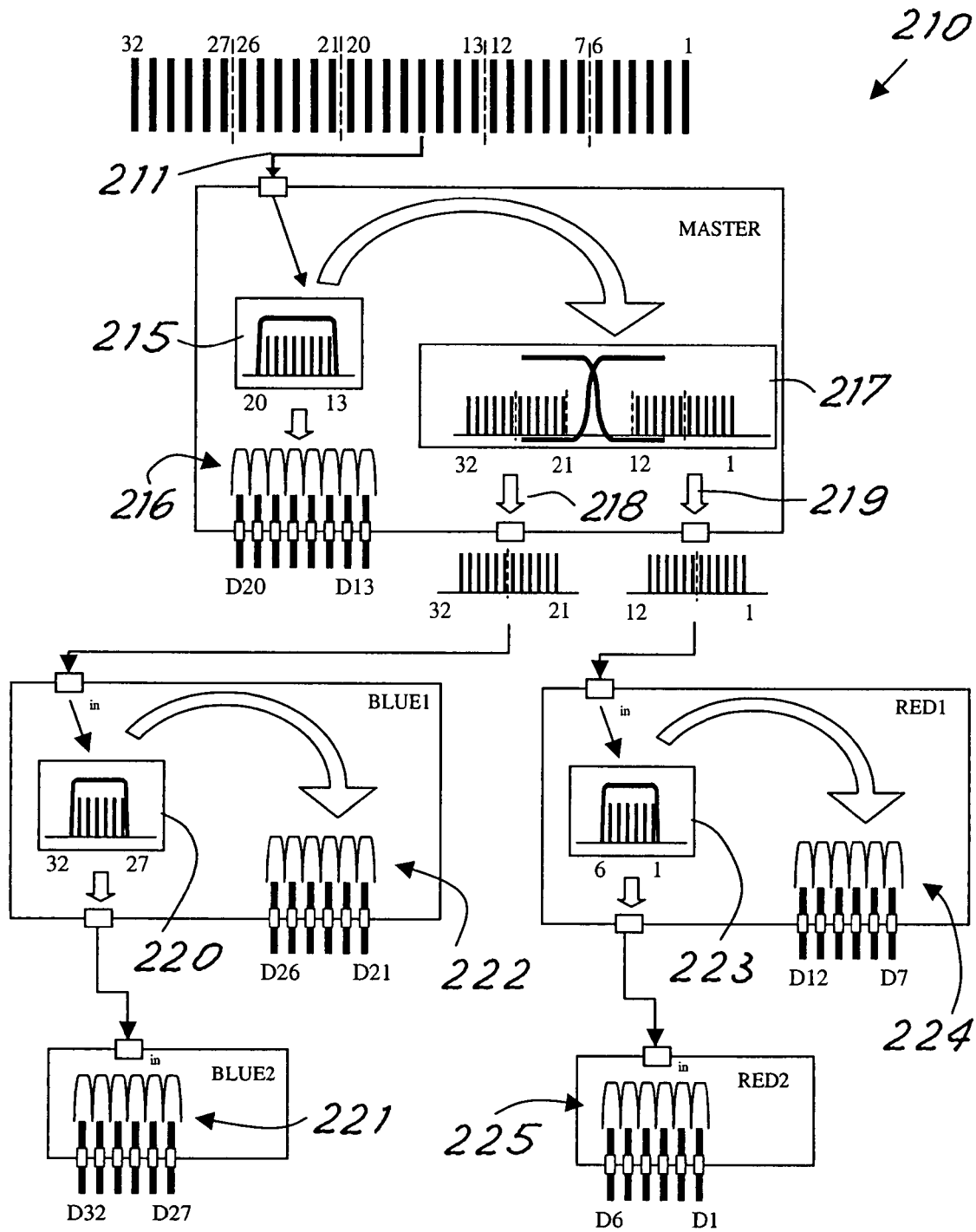
Figure 5:
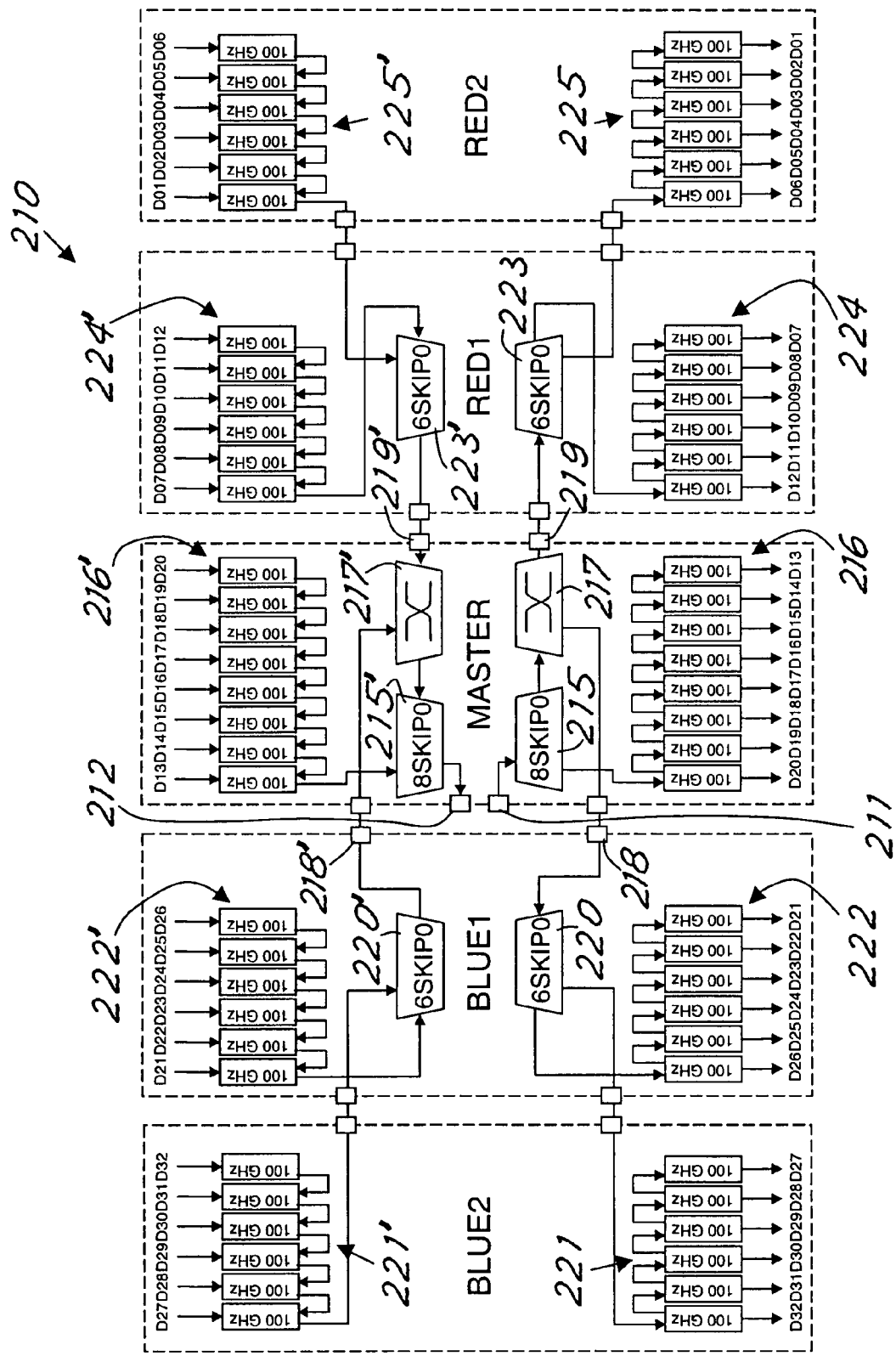
Figure 6:
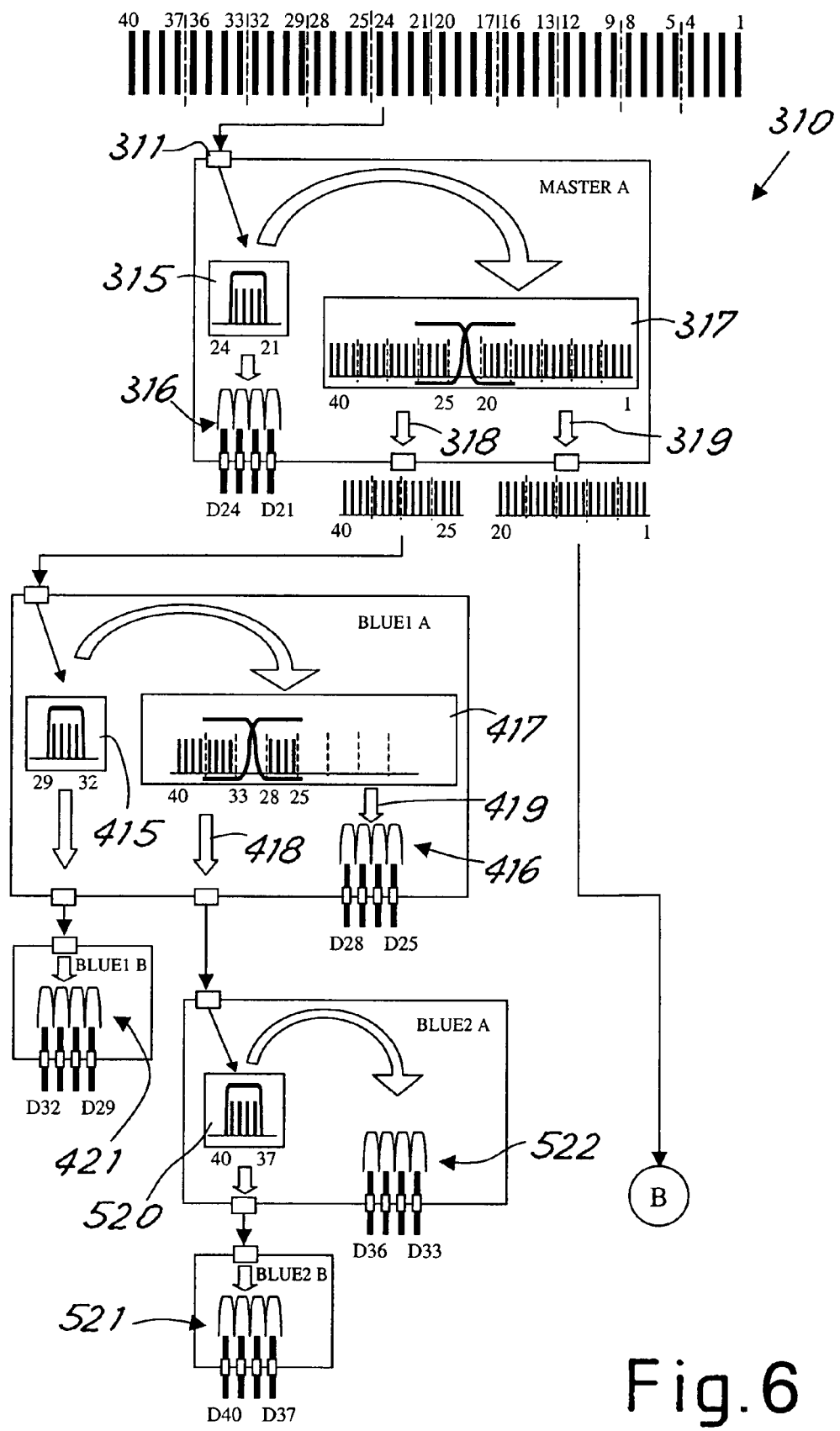
Figure 7:
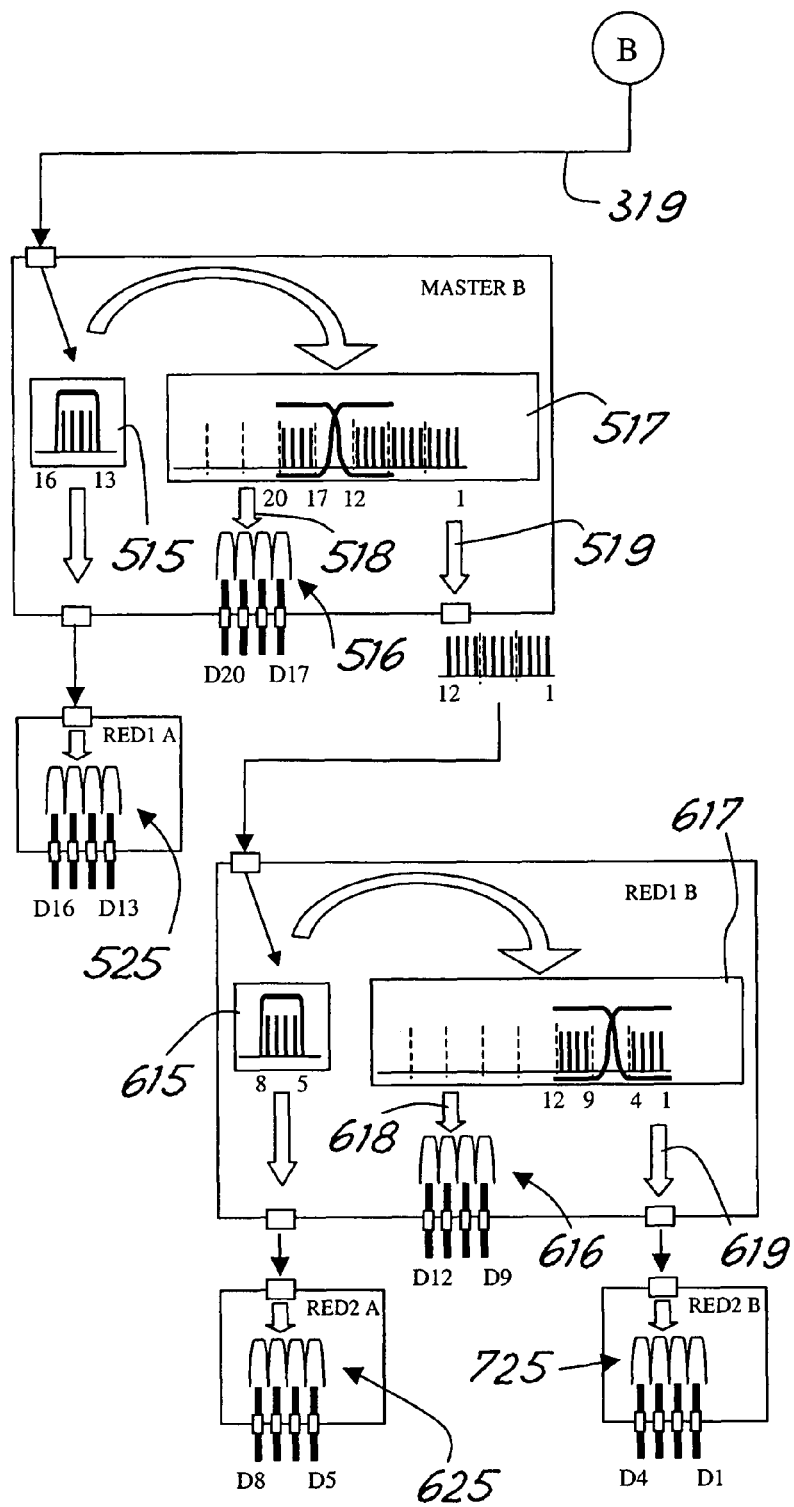
Figure 8:
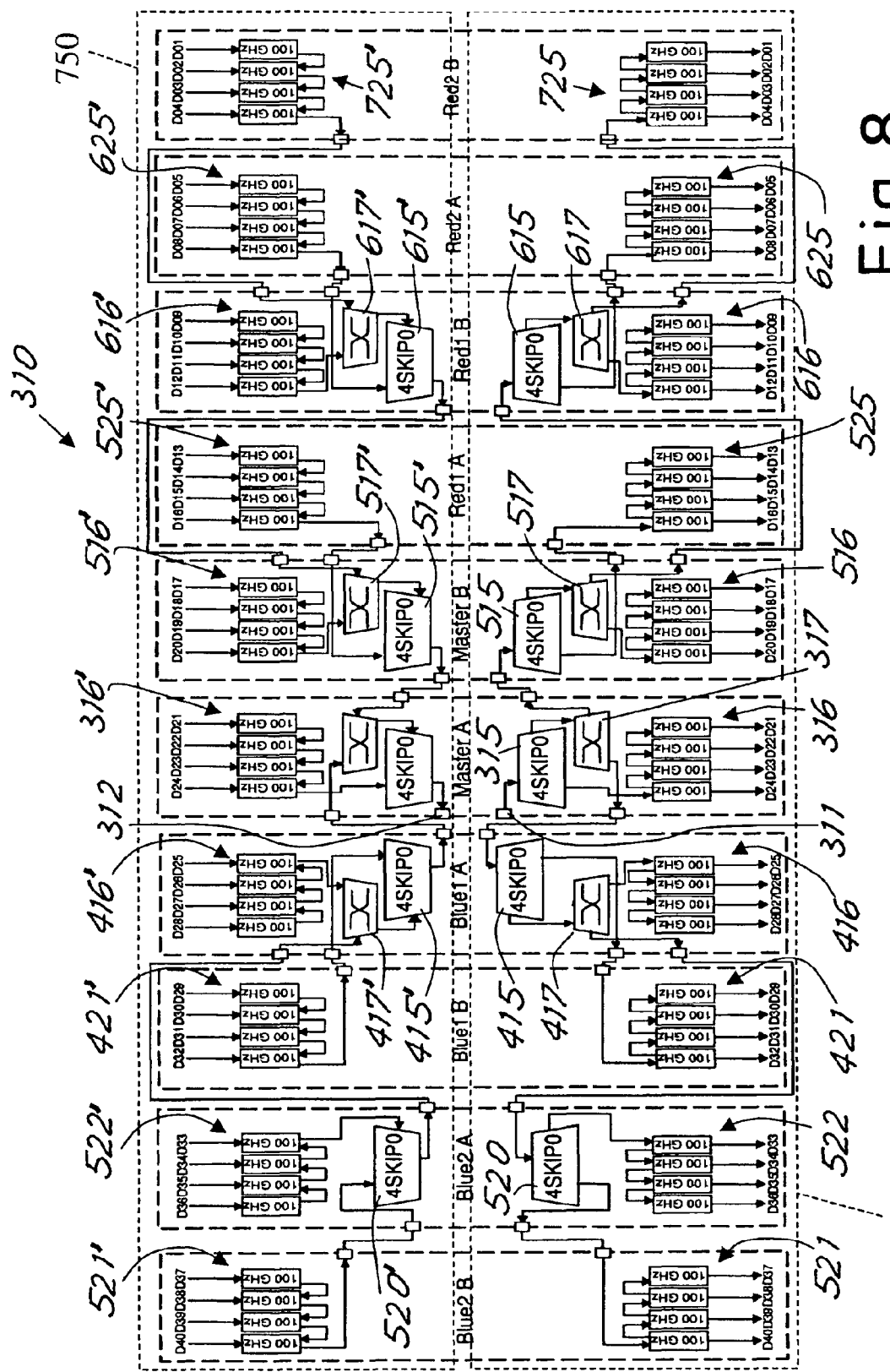
Figure 9:
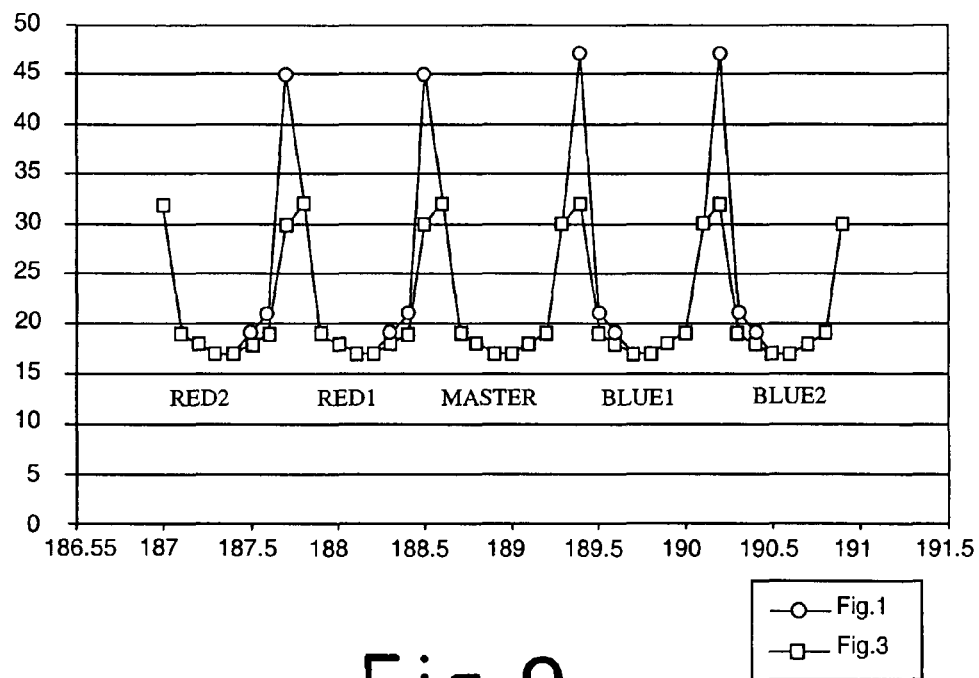
Figure 10:
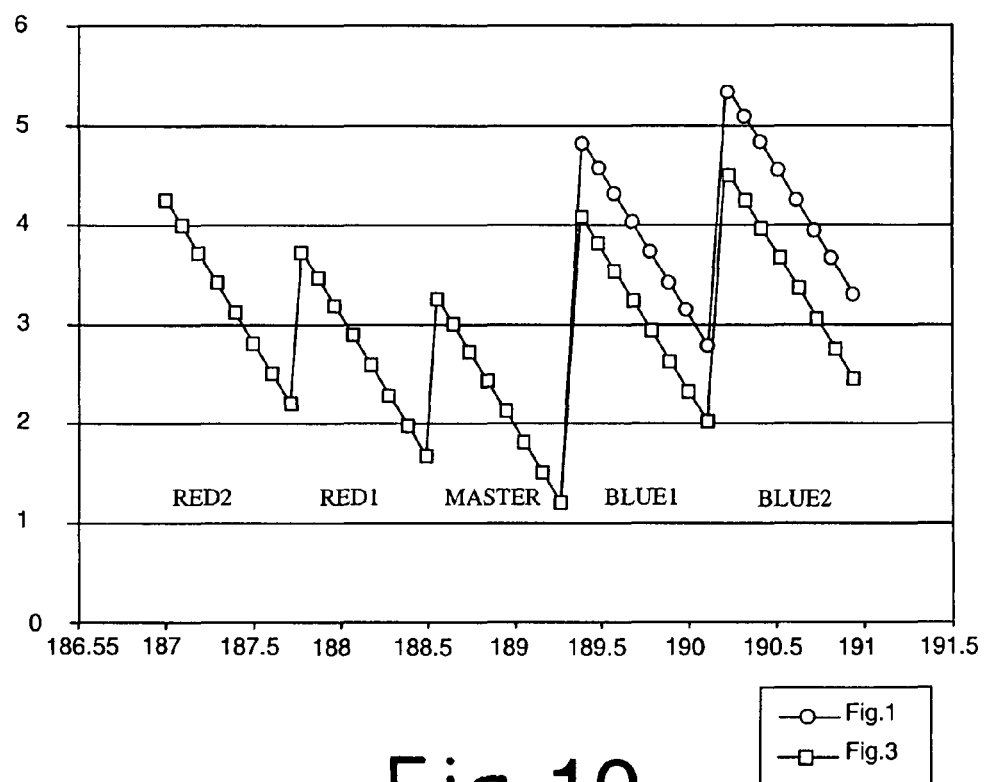

Embodiments of the invention will now be further described by way of example with reference to the accompanying drawings, of which:

FIG. 1 shows a diagram of a prior art MUX/DEMUX using cascaded 8skip0 filters,

FIG. 2a shows an operating diagram of a demultiplexer in accordance with a first embodiment of the present invention, FIG. 2b shows an operating diagram of a multiplexer in accordance with a first embodiment of the present invention, FIG. 3 shows a block diagram of the combined MUX/DEMUX of FIG. 2, FIG. 4 shows an operating diagram of a demultiplexer in accordance with a second embodiment of the present invention, FIG. 5 shows a block diagram of the demultiplexer of FIG. 4 with a corresponding multiplexer, FIGS. 6 and 7 show an operating diagram of a third embodiment of a demultiplexer in accordance with the present invention, FIG. 8 shows a block diagram of the demultiplexer of FIGS. 6 and 7 with a corresponding multiplexer, FIG. 9 shows a graph that compares the chromatic dispersion of the prior art solution shown in FIG. 1 with the chromatic dispersion of the embodiment of the invention of FIG. 2, and FIG. 10 shows a graph comparing the connection loss of the prior art solution shown in FIG. 1 with the connection loss of the embodiment of the invention of FIG. 2.

In this application the term 'Xskip0' will be used to mean a skip0-type filter with any number of X separate channels that are filtered from the signal as a single group or band. The number to be given to X in a particular filter will be defined when necessary each time. It will be appreciated that in other embodiments of the invention, X can be given different values to those indicated in the following description.

With reference to the figures, FIG. 1 shows an example of a prior art MUX/DEMUX designated as a whole by reference number 10 with 40 optical channels. In this example each channel has a bandwidth of 100 GHz The multiplexer 15 and the demultiplexer 16 each use a cascade of five 8skip0 filters 13. This enables five contiguous groups of eight contiguous channels to be extracted from the modulated signal for the demultiplexer 16, and five contiguous groups of eight contiguous channels to be combined for the multiplexer 15.

Each group of eight channels is sent to, or received from, a cascade of eight channel filters (indicated as a whole by reference number 14). The DEMUX circuit 16 (in the lower part of the drawing and with input 11) is symmetrical with the MUX circuit 15 (in the upper part of the drawing and with output 12). The difference between the multiplexer 15 and the demultiplexer 16 is the direction of propagation of the signals in the filters 13, 14.

FIG. 2a shows diagrammatically the operation of a first embodiment of the present invention that comprises an all-optical demultiplexer (DEMUX) example (designated as a whole by reference number 110). FIG. 2b shows diagrammatically the operation of a multiplexer (MUX) 130 that is equivalent to the demultiplexer of the first embodiment of the present invention shown in FIG. 2a. The MUX/DEMUX is for use with signals comprising 40 channels, and FIG. 3 shows an embodiment of a block diagram that can perform the operations of multiplexing and demultiplexing forty channels as illustrated in FIGS. 2a and 2b.

FIG. 2a shows the operations performed in a demultiplexing operation to extract the forty individual channels from a signal containing forty wavelength division multiplexed channels. A WDM signal supplied at 111 is applied to a first optical filter, which in this embodiment is an 8skip0 filter 115 in the MASTER module, which is centred at a frequency such that it can extract from the signal a first set of channels that comprises a band of eight intermediate channels corresponding to central channels 17 to 24.

The group of eight channels extracted by the 8skip0 filter 115 are sent to a first optical extraction unit, which in this embodiment comprises eight cascaded channel filters 116, each with an appropriate band to extract each of the eight channels. A channel filter is a filter with a bandwidth of one channel and a central wavelength centred on the preset channel to be extracted. The channels separated by cascaded filters 116 are each sent to respective outputs D17-D24. Extracting the eight intermediate channels 17 to 24 leaves a gap in the signal between channels 16 and 25.

The signal with the remaining channels (that is channels 1 to 16 and 25-40) is reflected by the 8skip0 filter 115 and applied to a second optical filter, which in this embodiment is a wavelength optical splitter 117 that is also in the MASTER module. The splitting operation divides the signal with the first set of channels extracted into two optical signals, which comprise a second and third set of channels each of which is directed down a different optical path 118 and 119.

The wavelength optical splitter 117 is arranged such that the wavelength at which the split is made, and the associated intersection zone, is located at a wavelength that is within the gap in the signal that has been left by the extraction of the eight channels by the 8skip0 filter 115. Therefore, the wavelength of the intersection zone can be as large as the bandwidth of the channels that have been extracted by the 8skip0 filter 115 (i.e. corresponding to a maximum of eight channels in this embodiment) without affecting any remaining channels (that is 1 to 16 and 25 to 40) and without reducing the performance of the circuit. This enables a relatively inexpensive economical splitter.

The sixteen channels on path 118 (that is the second set of channels corresponding to channels 25 to 40) are sent to a third optical filter, which in this embodiment is an 8skip0 filter 120 in module BLUE1. The 8skip0 filter 120 is arranged such that it's pass-band is positioned to extract a subset of eight channels (channels 33-40) that are not adjacent to the channels that have been extracted by the 8skip0 filter 115 in module MASTER.

The channels (25 to 32) that remain following the extraction by the 8skip0 filter 120 are sent to a second optical extraction unit, which in this embodiment comprises eight cascaded channel filters 122 to divide the remaining signal into individual channels. These individual channels are then sent to the respective outputs D25-D32. The 8skip0 filter 120 and the eight cascaded channel filters 122 are assembled in a module named BLUE1.

The channels extracted by the 8skip0 filter 120 in module BLUE1 are individually separated by a further second optical extraction unit, which comprises eight cascaded channel filters 121 in module BLUE2, and then sent to the respective outputs D33-D40.

The channels lower than the gap created by the first 8skip0 filter 115 in the MASTER module are sent over the path 119 to a further third optical filter, which comprises an 8skip0 filter 123 in module RED1. The 8skip0 filter 123 in module RED1 is arranged such that it's pass-band is positioned to extract the group of eight channels corresponding to channels 1 to 8. Again, channels 1 to 8 are not adjacent to the gap, and therefore are not adjacent to the set of channels that had previously been extracted by the 8skip0 filter 115 in the MASTER module.

The remaining channels (channels 9 to 16) are sent to a third optical extraction unit comprising eight cascaded channel filters 124, also in module RED1, to divide the signal into individual channels and send the individual channels to the respective outputs D09-D16.

The signal extracted by the 8skip0 filter 123 in module RED1 is applied to module RED2 where it is filtered by a further third optical extraction unit comprising eight cascaded channel filters 125 to obtain the eight channels 1 to 8, and these channels are then sent to respective outputs D01-D08.

Due to the channel gap in the signal that has been created by the first 8skip0 filter 115 in the MASTER module, and the subsequent use of the splitter 117, it is possible to create a parallel structure operating on the two paths 118, 119 derived from the initial signal. This allows a reduction in the number of filters traversed by the channels before being extracted individually, and also allows easy implementation of a modular structure that easily enables expansion of the number of channels handled. Operating on the signals on the two paths 118, 119 in parallel can also reduce the time taken for the WDM signal to be demulitplexed.

In addition, none of the 8skip0 filters are used on any neighbouring channel groups, and therefore the doubling effect of the chromatic dispersion of the channels at the edges of a filter is avoided.

The modules MASTER, BLUE1, BLUE2, RED1 and RED2 all comprise a single channel extraction module arranged to extract eight individual channels. The modular composition of the structure can enable further modules to be added to the structure to increase the number of channels that are demultiplexed, if required. The separate modules may be mounted on separate cards, on separate printed circuit boards (pcb's), in single housings, or may constitute separate integrated circuits, for example.

FIG. 2b shows the operations performed in a multiplexing operation to concatenate forty individual wavelength division multiplexed channels into a single signal on a single transmission path. The forty individual signals are supplied as individual channels on forty transmission paths as inputs D01 to D40. Eight of the input channels are applied to each of the individual modules, that is: MASTER, BLUE1, BLUE2, RED1 and RED2.

The eight individual channels 033 to 040 comprise a 20 subset of channels are supplied as inputs to module BLUE2, which are applied to a second optical grouping/concatenation unit comprising eight cascaded channel optical filters 121' where they are concatenated to form a band of the eight input channels 33 to 40 such that channels 33 to 40 are combined onto a single transmission path. The group of eight concatenated input signals 33 to 40 are then supplied from module BLUE2 to module BLUE1.

Channels 25 to 32 are supplied directly to inputs D25 to D32 in module BLUE1, where they are concatenated by a further second optical concatenation unit comprising eight cascaded channel optical filters 122'. The eight concatenated channels 33 to 40 and 25 to 32 are then applied on a single transmission path, as a single signal, to a third optical filter comprising an 8skip0 filter 120' where they are concatenated to form a single signal comprising a second set of channels that comprise a band of sixteen channels, 25 to 40.

Modules RED1 and RED2 with filters 125', 123' and 124' are similarly used to generate a single signal comprising a band of sixteen channels 01 to 16 from the signals applied at inputs D01 to D16.

The second set of channels comprising the band of sixteen channels, 01 to 16 is referenced 119', and the third set of channels comprising the band of sixteen channels, 25 to 40 is referenced as 118'. The two bands of sixteen channels 118', 119' are both supplied to a second optical filter that comprises a wavelength optical splitter/combiner 117' in the MASTER module.

For multiplexing operations, the wavelength splitter 117' is used in a reverse configuration such that the two signals that are supplied to the wavelength splitter 117' are combined into a single signal instead of a single signal being split into two signals. Combining the two signals 118' and 119', each comprising sixteen channels, generates a signal containing the second set of channels 1 to 16 and the third set of channels 25 to 40. The wavelength splitter 117 is arranged such that the intersection zone between the combined signals (corresponding to the wavelength at which a signal is split when the wavelength splitter is in a forward configuration when demultiplexing) is located in the gap between the two groups of sixteen channels 118' and 119'. That is, the signals 118' and 119' are combined at an intersection wavelength between channels 16 and 25.

Also supplied to the MASTER module at inputs D17 to D24 are signals representing channels 17 to 24. The signals 17 to 24 are supplied to a first optical grouping/concatenation unit comprising eight cascaded channel optical filters 116' in the MASTER module in order to generate a first set of channels that comprise the band of the eight concatenated channels 17 to 24.

The output of the wavelength splitter 117' and the output of the eight cascaded optical filters 116' are fed to a first optical filter, which comprises an 8skip0 filter 115' within the MASTER module. The 8skip0 filter is arranged to combine the first, second and third sets of channels, and to generate a WDM signal that comprises the forty channels, 01 to 40, at adjacent wavelengths. This signal can then be transmitted as a wavelength division multiplexed signal.

It will be appreciated that each of the three 8skip0 filters 120', 123' and 115' are centred on bands of 25 channels that are not adjacent to each other. 8skip0 filter 120' is centred on the band of channels 33 to 40, 8skip0 filter 123' is centred on the band of channels 01 to 08, and 8skip0 filter 115' is centred on the band of channels 17 to 24. By not using 8skip0 filters on adjacent channel bands, the chromatic dispersion of the channels at the edges of a filter is not doubled, as can be the case with the prior art.

It will be appreciated that the operations performed in the multiplexing operation are very similar to those performed in the demultiplexing operation. This is shown in FIG. 3 where the block diagram for the multiplexer 110 is shown above the demultiplexer 130, and the similarity of the components is illustrated.

The MUX/DEMUX comprises an input 111 for the signal containing the channels to be demultiplexed by the DEMUX 130 part of the circuit, and an output 112 for the signal containing the channels that have been multiplexed by the MUX 110 part of the circuit.

With regard to the MUX part 110 of FIG. 3, the input channels are grouped in bands of eight channels supplied to respective optical grouping/concatenation units, which in this embodiment comprise cascaded channel filters 121', 122', 116', 124', 125' so as to form five optical signals each containing a groups of eight channels. The end channel groups (channels 1-8 and 33-40) are applied to 8skip0 filters 120', 123' in modules BLUE1 and RED1 respectively. Two groups of channels 25-32 and 9-16 are also applied to the respective 8skip0 filters 120', 123' to make up a signal composed of the respective two channel groups of sixteen channels (channels 25 to 40, and 1 to 16) on each path 118' and 119'.

The splitter 117' receives the two signal paths 118' and 119' such that a gap exists in the combined signal that is between the channels that have been supplied on optical paths 118' and 119'. The gap comprises the central channels 17-24. 8skip0 filter 115' is used to fill the gap with channels 17 to 24 that correspond to signals that have been received on inputs D17 to D24 and subsequently filtered by cascaded channel filters 116'. Thus the signal comprising all forty channels is obtained at 112.

In accordance with the principles of this invention the total number of channels in the signal can vary, and the number of channels extracted as a group can also vary.

FIGS. 4 and 5 show a second embodiment of the invention, in which 32 channels are to be multiplexed/demultiplexed, and a combination of 8skip0 and 6skip0 filters are used. For the sake of simplicity FIG. 4 shows only the DEMUX part of the MUX/DEMUX (designated as a whole by 210) of the second embodiment.

The overall WDM signal with 32 channels is applied at 211 and reaches a first 8skip0 optical filter 215 in the MASTER module that is arranged to extract a group of eight intermediate channels (channels 13 to 20) from the signal. Extracting channels 13 to 20 leaves a gap in the remaining signal. The group of eight channels thus extracted is sent to eight cascaded channel optical filters 216 that are also in the MASTER module and are arranged such that the eight channels can be extracted individually. The individually extracted channels are each sent to respective outputs D13-D20.

The signal with the remaining channels is reflected from the 8skip0 filter 215 and sent to a wavelength optical splitter 217 that is also in the MASTER module. The splitter 217 divides the reflected signal into two sets/groups of channels. One of the groups comprises channels 1 to 12, and the other group comprises channels 21 to 32. One of the groups of channels have wavelengths that are above the gap of channels created by the 8skip0 filter 215, and the other group of channels have wavelengths that are below the gap. The two groups of channels are sent down separate optical paths 218, 219.

Apart from the settings of the filters 215, 216 and the splitter 217, the structure of the MASTER module of FIG. 4 is the same as that of the MASTER module of the first embodiment of the invention shown in FIG. 2a.

The twelve channels that are above the gap (channels 21 to 32) are sent to 6skip0 filter 220 in module BLUE1 on path 218. The 6skip0 filter 220 is arranged to extract the band/group of six channels 32-27. Channels 32-27 are not adjacent to the channels that have been extracted by the previous 8skip0 filter 215 in the MASTER module such that chromatic dispersion caused by both of any two of the Xskip0 filters does not effect a single channel. The remaining six channels, channels 21 to 26, that is the channels that are between the bands that have been extracted by 8skip0 filter 215 and 6skip0 filter 220, are sent to six cascaded channel filters 222 in module BLUE1 that are arranged to divide the signal into the individual channels and send them to respective outputs D21-D26.

The channels extracted by the 6skip0 filter 220 are sent to module BLUE2 where they are separated by six cascaded channel filters 221 and sent to the respective outputs D27-D32.

In a similar manner, the twelve channels below the gap created by the 8skip0 filter 215 in the MASTER module are sent on path 219 to 6skip0 filter 223 in module RED1. 6skip0 filter 223 is arranged with a band positioned to extract six channels (channels 1-6) that are not adjacent to the channels extracted by the 8skip0 filter 215 in the MASTER module. The remaining channels (channels 7 to 12) are sent to six cascaded channel filters 224 in module RED1 to divide the band of remaining channels into individual channels, and send them to respective outputs D07-D12.

The channels extracted by the 6skip0 filter 223 in module RED1 are sent to module RED2 where they are individually separated by six cascaded channel filters 225 and sent to respective outputs D01-D06.

It will be appreciated from the block diagram of FIG. 5, that a multiplexer that corresponds to the demultiplexer of FIG. 4 will comprise the same components as the demultiplexer of FIG. 4, only with the direction of travel of the signals reversed.

The structures illustrated in FIGS. 2 to 5 have an optimised number of filters, whilst providing minimised deterioration of the channels. However, it will be appreciated that other structures can be realized in accordance with this invention depending on the availability of filters and specific modularity requirements.

FIGS. 6, 7 and 8 show a third embodiment of a MUX/DEMUX (designated as a whole by reference number 310) of the invention. The MUX/DEMUX operates on forty channels in total, but with extraction of groups of four channels at a time. Although it is clear that this structure entails the use of a greater number of filters than the first embodiment of the invention, the number of channel filters that the last channel extracted for each group has to traverse is still reduced when compared with the prior art systems. Doubling of the chromatic dispersion that would by caused by the use of adjacent Xskip0 filters is also avoided.

As shown in FIG. 6, the overall forty-channel WDM signal is applied at 311 and reaches a first 4skip0 optical filter 315 in module MASTER A that is centred to extract channels 21 to 24 that comprise a group of four intermediate channels from the signal. Extracting the group of four channels leaves a gap in the original signal.

The group of four channels thus extracted are sent to four cascaded channel optical-filters 316 in module MASTER A so as to separate and send each channel to a respective output D21-D24.

The signal with the remaining channels is reflected from the 4skip0 filter 315 and is sent to a wavelength optical splitter 317 to divide the reflected signal onto two optical paths 318, 319.

The sixteen 'high' channels on path 318 are sent to a 4skip0 filter 415 in module BLUE1 A, arranged to extract a band comprising channels 29-32 that is not adjacent to the channels extracted by the 4skip0 filter 315 in the MASTER A module. The extracted band is sent to four cascaded channel filters 421 in module BLUE1 B, to divide the band into individual channels and send them to the respective outputs D29-D32.

The remaining channels are reflected towards a splitter 417 in module BLUE1 A to divide the reflected signal onto two paths 418, 419, wherein each of the paths 418, 419 comprises channels that are either above or below the gap created by the 4skip0 filter 415 in module BLUE1 A.

The low channels (channels 25 to 28) on the path 419, are supplied to four cascaded channel filters 416 in module BLUE1 A that divide the channels individually to respective outputs D25-D28.

The high channels (channels 33 to 40) on path 418 are sent to a 4skip0 filter 520 in module BLUE2 A to extract the group of channels (channels 37-40) that are not adjacent to the group extracted by the 4skip0 filter 415 in module BLUE1 A. The extracted signal is then sent to four cascaded channel filters 521 in module BLUE2 B to divide them individually to respective outputs D37-D40. The remaining channels (channels 33 to 36), are reflected by the 4skip0 filter 520 in module BLUE2 A and are sent to four cascaded channel filters 522 in module BLUE2 A that extract the individual channels and sends the individual channels to the respective outputs D33-D36.

As shown in FIG. 7, the twenty 'low' channels initially conveyed on the path 319 reach a 4skip0 filter 515 in module MASTER B with a band positioned to extract another group of four intermediate channels (channels 13-16) that are not adjacent to the channels extracted by the 4skip0 filter 315 in module MASTER A. The extracted signal is sent to four cascaded channel filters 525 in module RED1 A to divide the extracted signal into individual channels and then send them to the respective outputs D13-D16.

The remaining channels are reflected by the 4skip0 filter 515 in module MASTER B to a splitter 517 in module MASTER B to divide the signal into the channels that are above and below the gap created by the 4skip0 filter 515 in module MASTER B, and send the groups of channels over two paths 518, 519.

The high channels (channels 17 to 20) on the path 518 are applied to four cascaded channel filters 516 in module MASTER B to divide them individually to respective outputs D17-D20.

The low channels (from 1 to 12) on the path 519 are sent to 4skip0 filter 615 in module RED1 B to extract the set of channels (channels 8-5) that are not adjacent to the group of channels that have been extracted by the 4skip0 filter 515 in module MASTER B. The extracted channels are sent to four cascaded channel filters 625 in module RED2 A to divide them individually among respective outputs D5-D8.

The remaining channels, that is those reflected by the 4skip0 filter 615 in module RED1 B, are applied to a splitter 617 in module RED1 B to divide the signal into the channels that are above and below the gap produced by the 4skip0 filter 615 in module RED1 B. The divided signals are applied to paths 618 and 619.

The two groups of channels (both of four channels each) thus obtained on the paths 618 and 619 are each applied to four cascaded channel filters. The signal on path 618 is applied to four cascaded channel filters 616 in module RED1 B, and the signal on path 619 is applied to four cascaded channel filters 725 in module RED2 B. The cascaded channel filters 616 and 725 each supply the individual channels to outputs D9 to D12 and D1 to D4 respectively. Separation of all the channels starting from the initial WDM signal is thus obtained.

FIG. 8 shows the modular demultiplexer circuit 752 that realizes the demultiplexing operation described in FIGS. 6 and 7. FIG. 8 also comprises a multiplexer circuit 750 that corresponds to the demultiplexer circuit 752. The MUX circuit 750 comprises components that correspond to the DEMUX circuit 753 and uses the same numbering of components with an apostrophe (').

Use of the structure of embodiments of the invention allows a low cost system, with a lower maximum chromatic dispersion, lower maximum insertion loss, and a better uniformity when compared with the prior art.

As an example of the improved performance, FIGS. 9 and 10 show a comparison between the results of chromatic dispersion and loss of insertion of the prior art system of FIG. 1 with the embodiment of the invention of FIG. 3.

Both FIG. 9 and FIG. 10 relate to the band L, from 187.0 to 190.9 THz, but it will be appreciated that the same structure with the same advantages applies to other optical bands of interest such as for example band C from 192.1 to 196 THz.

To generate the dispersion graphs of FIG. 9, it was assumed that the filters add a chromatic dispersion of 15 ps/nm on the channels at the edges of filtered bands (even the reflected channels), 2 ps/nm to the channels that are positioned in a pass-band, and 1 ps/nm to the other channels (and then zero). FIG. 9 shows that the chromatic dispersion on the channels at the edges of bands/groups of the embodiment of the invitation is halved compared with that of the prior art system.

To generate the graphs of the insertion losses of FIG. 10, it is assumed that the loss of transmission of each of the filters is 0.6 dB, and the loss of reflection is 0.3 Db, while loss of connection is 0.2 dB (average). Comparison of the two solutions shows that the losses on the upper channels are considerably reduced by applying the principles of the invention and, especially, are made more uniform with those of the lower channels.

It will be appreciated that the invention is not limited to the above described preferred embodiments.

Although the embodiments of FIGS. 2 and 3 use 8skip0 filters to optimise costs, expandability and performance, it will be appreciated that other band-pass filters, and other Xskip0 filters with a different value for X, could be used. Structures and circuits in accordance with the principles of this invention provide high modularity, such that it is possible to combine modules with different numbers of extracted channels. For example, in the embodiment of FIG. 6, the group of eight channels on the path 418 obtained in the BLUE1 A module could instead be sent to a module for extraction with eight cascaded channel filters, such as that shown in module BLUE2 of FIG. 2. The same applies for the corresponding MUX.

In some embodiments Xskip0 filters having different values for X, and therefore being arranged to extract different sized wavelength bands of channels, may be used on different sets and subsets of channels within the same multiplexer/demultiplexer. The wavelength gap created by the extraction of channels by a band-pass filter need not necessarily be located at the centre of the remaining channels. The gap could be asymmetrically disposed in the channels in order to provide conveniently sized subsets for further processing. In some embodiments the wavelength gap is symmetrically disposed.

The choice among the various possibilities of the number and types of filters used may depend on the factors of cost, modularity and signal deterioration, and what values are considered acceptable by an administrator/user.

The number of channels (X) extracted by the Xskip0 filter preceding the splitter should be sufficiently high for the characteristic curve/transmission profile of the splitter to fit into the 'gap' of channels created by the Xskip0 without attenuating any of the channels to either side of the gap. The quality of the splitter that is to be used may determine how many channels need to be extracted by the Xskip0 filter to create the gap.

In a preferred structure in accordance with this invention it is possible to use a recursive structure; that is:

a) using a first Xskip0 filter to extract a first set of channels that is not adjacent to any previously extracted set of channels;

b) dividing the remaining signals into two further sets of signals;

c) repeating steps a) and b) for each subsequent divided set of signals until each set of signals is smaller than a threshold size; and d) extracting the individual channels from each of the sets of channels.

It will be appreciated that a first set of channels extracted by a first optical filter need not necessarily be towards the middle of the WDM signal. In some embodiments the first set of channels can be located towards an edge of the WDM signal. What is important is that the next downstream filter has a cut-off/transition wavelength that is located at a wavelength that corresponds to a channel that has been extracted by the first optical filter. In such embodiments a third optical filter (and in some embodiments, further still optical filters) with a band-pass characteristic can still be used to extract a further group/band of channels that is not adjacent to a band/group of channels that has been extracted by the first optical filter, or any other group/band of channels.

It will be appreciated that any of the features/advantages discussed in relation to a multiplexer, or multiplexing operation, are equally applicable to a demultiplexer, or demultiplexing operation, and vice versa.

It will also be appreciated that any feature in any embodiment of the invention described above may be a feature that can be used with any other embodiment of the invention described above.

The invention claimed is:

1. An optical demultiplexing structure for demultiplexing channels from a wavelength multiplexed optical signal comprising:
a first optical filter having a band-pass characteristic and operative to extract a first set of channels from an optical signal, the first set of channels including at least one channel within the pass-band of the first optical filter and not adjacent to a filtering edge of the first optical filter, and one channel adjacent each filtering edge of the first optical filter, wherein the first set of channels comprises a set of intermediate wavelength channels within a full set of channels in the optical signal;
a first high/low wavelength optical splitter connected to the first optical filter and having an intersection wavelength that is within the pass-band of the first optical filter, and is configured to divide the remaining channels not extracted by the first optical filter into a second set of channels that have wavelengths lower than the wavelengths of the intermediate channels and a third set of channels that have wavelengths higher than the wavelengths of the intermediate channels; and
a second optical filter having a pass-band characteristic and operative to extract a first subset of channels from the second set of channels, the first subset of channels including at least one channel within the pass-band of the second optical filter and not adjacent to a filtering edge of the second optical filter, and one channel adjacent each filtering edge of the second optical filter, such that no channel has more than one of the filtering edge adjacencies.

2. The demultiplexing structure of claim 1 further comprising a first optical channel extraction unit configured to extract individual channels from at least one of the first and second sets of channels, and a second optical channel extraction unit configured to extract individual channels from the first subset of channels.

3. The demultiplexing structure of claim 2 wherein at least one of the first and second optical channel extraction units comprise at least one cascade of channel filters.

4. The demultiplexing structure of claim 1 wherein the first optical filter comprises an Xskip0 type optical filter.

5. The demultiplexing structure of claim 1 wherein the second optical filter comprises an Xskip0 type optical filter.

6. The demultiplexing structure of claim 1 wherein the first optical filter is configured to extract a sufficient number of channels such that a characteristic curve of the optical splitter fits into a wavelength gap corresponding to the extracted channels without attenuating any of the channels in the second or third sets of channels.

7. The demultiplexing structure of claim 2 further comprising a third optical extraction unit configured to extract individual channels from the third set of channels.

8. The demultiplexing structure of claim 7 wherein each of the first, second, and third optical channel extraction units are assembled as respective extraction modules such that the demultiplexing structure comprises a modular demultiplexing structure.

9. The demultiplexing structure of claim 1 further comprising a second high/low wavelength optical splitter associated with the second optical filter, the second optical splitter having an intersection wavelength within the pass-band of the second optical filter, and configured to divide the channels that remain after the second optical filter extracts the first subset of channels into second and third subsets of channels.

10. The demultiplexing structure of claim 9 wherein the second optical splitter is configured to divide the channels that remain after the second optical filter extracts the first subset of channels into a second subset of channels having wavelengths lower than the wavelengths of the first subset of channels, and a third subset of channels having wavelengths higher than the wavelengths of the first subset of channels.

11. The demultiplexing structure of claim 1 wherein at least one of the first and second optical filters comprises an Xskip0 type optical filter having a band-pass characteristic for extracting at least four channels.

12. The demultiplexing structure of claim 11 wherein the Xskip0 type optical filter is configured to extract eight channels.

13. An optical multiplexing structure for multiplexing channels to obtain a wavelength division multiplexed optical signal comprising:
a first optical filter having a band-pass characteristic, and operative to form a wavelength division multiplexed (WDM) optical signal by grouping a first set of channels having wavelengths that are within the pass-band of the first optical filter with a second set of channels having wavelengths that are outside of the pass-band of the first optical filter, wherein the first set of channels includes at least one channel within the pass-band of the first optical filter and not adjacent to a filtering edge of the first optical filter, and one channel adjacent each filtering edge of the first optical filter;
a first high/low wavelength optical combiner comprising an optical wavelength splitter operated in reverse configuration and having an intersection wavelength that is within the pass-band of the first optical filter, the first optical combiner being configured to group the second set of channels; and
a second optical filter having a band-pass characteristic, and operative to group a first subset of channels having wavelengths within its pass-band, wherein the first subset of channels includes at least one channel within the pass-band of the second optical filter and not adjacent to a filtering edge of the second optical filter, and one channel adjacent each filtering edge of the second optical filter, such that the first subset of channels forms a subset of the second set of channels and further such that no channel has more than one of the filtering edge adjacencies.

14. The multiplexing structure of claim 13 further comprising a first optical grouping unit configured to concatenate individual channels into at least one of the first and second sets of channels, and a second optical grouping unit configured to concatenate individual channels into the first subset of channels.

15. The multiplexing structure of claim 14 wherein at least one of the first and second optical channel grouping units comprises at least one cascade of individual channel filters.

16. The multiplexing structure of claim 13 wherein the first optical filter comprises an Xskip0 type filter, where X indicates a predetermined number of channels.

17. The multiplexing structure of claim 13 wherein the second optical filter comprises an Xskip0 type filter, where X indicates a predetermined number of channels.

18. The multiplexing structure of claim 14 wherein:
the first set of channels comprises an intermediate set of channels;
the first optical combiner has an intersection zone within the pass-band of the first optical filter, and is further configured to combine the second set of channels having wavelengths lower than the first set of channels with a third set of channels having wavelengths higher than the first set of channels; and
the first optical filter is further configured to combine the first, second and third sets of channels.

19. The multiplexing structure of claim 18 further comprising a third optical grouping unit.

20. The multiplexing structure of claim 19, wherein each of the first, second, and third grouping units are mounted on a respective multiplexing module such that the multiplexing structure comprises a modular structure.

21. The multiplexing structure of claim 13 further comprising a second optical combiner associated with the second optical filter and having an intersection wavelength corresponding to a wavelength within the pass-band of the second optical filter, and configured to combine a second subset of channels for output to the second optical filter where the second subset of channels is combined with the first subset of channels.

22. The multiplexing structure of claim 21 wherein the second optical combiner comprises an optical splitter operated in reverse configuration and having an intersection wavelength within the pass-band of the second optical filter, and is operative to combine the second subset of channels having wavelengths higher than those of the first subset of channels with a third subset of channels having wavelengths lower than those of the first subset of channels.

23. The multiplexing structure of claim 13 wherein at least one of the first and second optical filters comprises an Xskip0 type optical filter having a band-pass characteristic selected for extracting at least four channels.

24. The multiplexing structure of claim 23 wherein the Xskip0 type optical filter is configured to extract eight channels.

25. A method of optically demultiplexing channels from a wavelength multiplexed optical signal comprising:
extracting, using an optical filter, a first set of channels from the wavelength multiplexed optical signal, wherein the first set of channels comprises a set of intermediate wavelength channels within a full set of channels in the optical signal, wherein the first set of channels comprises a plurality of channels not adjacent to a filtering edge of the optical filter, and one channel adjacent each filtering edge of the optical filter;
dividing non-extracted channels into a second set of channels at a cut-off wavelength that corresponds to a channel within the first set of channels by dividing the non-extracted channels into the second set of channels having wavelengths lower than the first set of channels, and a third set of channels having wavelengths higher than the first set of channels; and
extracting a subset of channels from the second set of channels, wherein the subset of channels comprises a plurality of channels not adjacent to a filtering edge of an optical filter, and one channel adjacent each filtering edge of the optical filter, such that no channel has more than one of the filtering edge adjacencies.

26. The method of claim 25 further comprising separating the sets and subsets of channels into individual channels.

27. The method of claim 25 further comprising repeating the method steps with remaining channels until a number of channels that remains is less than or equal to a predetermined number of channels.

28. A method of generating a wavelength division multiplexed optical signal comprising the steps of:
grouping, using an optical filter, at least three channels to form a first set of channels, wherein the first set of channels comprises a plurality of channels not adjacent to a filtering edge of the optical filter, and one channel adjacent each filtering edge of the optical filter, and wherein the first set of channels comprises an intermediate set of channels;
grouping, using an optical filter, at least three different channels having wavelengths that are lower than the first set of channels to form a first subset of channels, wherein the first subset of channels comprises a plurality of channels not adjacent to a filtering edge of the optical filter, and one channel adjacent each filtering edge of the optical filter, such that no channel has more than one of the filtering edge adjacencies;
forming a second set of channels by grouping the first subset of channels with at least one additional channel having wavelengths that are lower than the first set of channels, such that the second set of channels have wavelengths that are lower than the first set of channels;
forming a second set of channels by grouping at least two channels having wavelengths that are higher than the first set of channels;
grouping, using an optical combiner having an intersection wavelength that is within the first set of channels, the second set of channels and the third set of channels; and
grouping the first, second, and third sets of channels to generate the wavelength division multiplexed optical signal.

29. The method of claim 28 further comprising repeating the method steps to combine a plurality of channels into additional wavelength division multiplexed optical signals.

30. The method of claim 28 further comprising repeating the method steps to combine one or more subsets of channels into additional wavelength division multiplexed optical signals.

31. The method of claim 28 further comprising concatenating individual channels into one or more of the first second, and third sets of channels, and the first subsets of channels.

32. A method of multiplexing a wavelength division multiplexed signal, the method comprising:
allocating a plurality of input signals to a corresponding plurality of frequency signals; and
producing a wavelength division multiplexed signal comprised of the frequency signals by transducing a first plurality of input signals to a corresponding first group of frequency signals having contiguous adjacent frequencies;
combining the first group of frequency signals in a first bandpass optical filter such that one frequency signal is adjacent each filtering edge of the first optical filter and at least one frequency signal is not adjacent a filtering edge of the first optical filter;
transducing a different second plurality of input signals to a corresponding second group of frequency signals having contiguous adjacent frequencies;
combining the second group of frequency signals in a second bandpass optical filter such that one frequency signal is adjacent each filtering edge of the second optical filter and at least one frequency signal is not adjacent a filtering edge of the second optical filter;

transducing a different third plurality of input signals to a corresponding third group of frequency signals having contiguous adjacent frequencies;

combining the second qroup of frequency signals in a second bandpass optical filter such that one frequency signal is adjacent each filtering edge of the second optical filter and at least one frequency signal is not adjacent a filtering edge of the second optical filter;

wherein the first group of contiguous frequency signals has frequencies that are below a range of frequencies of the third group of frequency signals and the second qroup of contiguous frequency signals has frequencies that are above a range of frequencies of the third group of frequency signals;

combining the first and second groups of frequency signals together with additional frequency signals to form an intermediate combined signal; and subsequently adding the third group of frequency signals to the intermediate combined signal, between the first and second groups, to form the wavelength division multiplexed signal, such that no frequency signal has more than one of the filtering edge adjacencies.

* * * * *

UNITED STATES PATENT AND TRADEMARK OFFICE
CERTIFICATE OF CORRECTION

| | |
|---|---|
| PATENT NO. | : 8,594,504 B2 |
| APPLICATION NO. | : 11/915565 |
| DATED | : November 26, 2013 |
| INVENTOR(S) | : Costantini et al. |

It is certified that error appears in the above-identified patent and that said Letters Patent is hereby corrected as shown below:

In the Specification,

In Column 16, Line 19, delete "by caused by" and insert -- be caused by --, therefor.

In the Claims,

In Column 22, Line 46, in Claim 31, delete "first second," and insert -- first, second, --, therefor.

In Column 23, Line 6, in Claim 32, delete "qroup" and insert -- group --, therefor.

In Column 23, Line 14, in Claim 32, delete "qroup" and insert -- group --, therefor.

Signed and Sealed this
Eleventh Day of August, 2015

Michelle K. Lee
*Director of the United States Patent and Trademark Office*